United States Patent
Hendrix et al.

(10) Patent No.: US 12,421,463 B2
(45) Date of Patent: Sep. 23, 2025

(54) CONTINUOUS OIL RECOVERY PROCESS FROM SPENT OILY SOLID MATERIAL

(71) Applicant: DESMET USA, INC., Marietta, GA (US)

(72) Inventors: William Blake Hendrix, Kennesaw, GA (US); Timothy Kemper, Marietta, GA (US); Marc Kellens, Mechelen-Muizen (BE)

(73) Assignee: DESMET USA, INC., Marietta, GA (US)

( * ) Notice: Subject to any disclaimer, the term of this patent is extended or adjusted under 35 U.S.C. 154(b) by 281 days.

(21) Appl. No.: 18/113,960

(22) Filed: Feb. 24, 2023

(65) Prior Publication Data
US 2023/0265352 A1    Aug. 24, 2023

Related U.S. Application Data

(60) Provisional application No. 63/313,279, filed on Feb. 24, 2022.

(51) Int. Cl.
C11B 15/00    (2006.01)
C10G 67/02    (2006.01)
C10G 67/04    (2006.01)

(52) U.S. Cl.
CPC ..... *C10G 67/0436* (2013.01); *C10G 2300/44* (2013.01)

(58) Field of Classification Search
CPC ........... C10G 67/0436; C10G 2300/44; Y02W 30/74; C11B 13/04
See application file for complete search history.

(56) References Cited

U.S. PATENT DOCUMENTS 6,780,321 B2    8/2004   Chanrai
2015/0353866 A1  12/2015  Stigsson et al.

FOREIGN PATENT DOCUMENTS

| CN | 106318594 A | 11/2019 |
| JP | 2009138144 | 10/2012 |
| KR | 1020050095408 A | 9/2005 |
| KR | 1020150096148 A | 8/2015 |
| WO | WO2021/213991 | 10/2021 |
| WO | WO2022/036117 | 2/2022 |

OTHER PUBLICATIONS

European Patent Office, Communication pursuant to Article 94(3) EPC for EP Application No. 23158525.8 filed on Feb. 24, 2023, issued Apr. 29, 2024.

(Continued)

*Primary Examiner* — Youngsul Jeong
*Assistant Examiner* — Jason Y Chong
(74) *Attorney, Agent, or Firm* — McDonald Hopkins LLC

(57) ABSTRACT

A process for the treatment of oily hazardous solid materials such as for example spent bleaching earths. The process allows a safe and economical recovery of typically about 85% to 95% of the residual oil contained in such oily hazardous solid materials and transforms those ones into inert materials safe to transport, store, dispose of, or even makes them valuable for some applications. The process includes the production of a transportation slurry and at least one extraction slurry. The at least one extraction slurry is separated in at least one centrifuge decanter.

13 Claims, 2 Drawing Sheets

(56) References Cited

OTHER PUBLICATIONS

European Patent Office, Extended Search Report for EP Application 23156525.8 filed Feb. 24, 2023, issued Jul. 18, 2023.

Anonymous, "Hydrotreated vegetable oil (HVO)—premium renewable biofuel for diesel engines", Neste Oil Proprietary publication for public use, Feb. 2014.

PCT International Search Report & Written Opinion for PCT/US2023/013879 which was filed on Feb. 24, 2023; Report mailed on Sep. 19, 2023, 8 Pages.

CONTINUOUS OIL RECOVERY PROCESS FROM SPENT OILY SOLID MATERIAL

CROSS REFERENCE TO RELATED APPLICATIONS

This application claims priority to U.S. Patent Application No. 63/313,279, filed on Feb. 24, 2022, entitled "CONTINUOUS OIL RECOVERY PROCESS FROM SPENT OILY SOLID MATERIAL", which is incorporated herein by reference in its entirety.

TECHNICAL FIELD

The present invention relates to a process for the treatment of oily flammable solid materials (collectively designated "SBE"), such as for example spent bleaching earths, active carbon, silicas or filter aids resulting from some refining step(s) of glyceridic materials such as vegetable or animal oils and fats, used cooking oils or other waste fat streams, and containing typically 25 to 30% of residual oil or fat. More particularly, the invention provides a safe, continuous, downtime-free and economical process for the recovery of typically about 90% to 95% of the residual oil contained in said oily flammable solid materials and transforms those ones into inert materials easy to transport, store, or dispose of without risk of spontaneous combustion, or even makes them valuable for some applications. The recovered oil is preferably used as feedstock in a hydrotreatment process yielding renewable fuel. Alternatively, the recovered oil can be used for various oleochemical applications.

BACKGROUND

Powdery, solid adsorbents are intensively used in one or more steps of the refining of vegetable and animal oils and fats, collectively designated as "glyceridic oil" or "oil". Adsorbents are contacted with oil to remove various unwanted impurities and then separated from the treated oil usually by filtration with for example vertical leaf-filters. The most widespread adsorbents used in the refining of oil are bleaching earths (also designated as bleaching clays) which are able to remove pigments and many other impurities from said oil. Several grades of bleaching earths are available and, depending on the exact application, some of those grades are preferred.

During a bleaching step, along with the impurities that are wished to be removed from the oil, and that are mostly adsorbed on the bleaching earth (in particular the metals such as P, Ca, Mg and Fe), a significant amount of oil will remain absorbed by the bleaching earth, even after a careful filtration. Consequently, after the bleaching operations, the spent bleaching earth (SBE), contains all the removed pigments and impurities but also about 25% to about 30% of oil (w/w). This oil absorption on the SBE represents a substantial material loss, and furthermore complicates their disposal. Indeed, the presence of oil in the SBE makes them prone to auto-ignition and therefore they are considered flammable waste, requiring regulated costly disposal procedures. Furthermore, for the same reason, their storage and transportation create safety concerns.

Consequently, several processes to extract the residual oil contained in SBE have been proposed.

The most obvious process to extract the residual oil from the SBE consists in utilizing a percolation solvent extractor similar to the one used for the solvent extraction of oleaginous materials. This approach is however not cost effective because the solvent percolation through SBE is unsatisfactory. Indeed, bleaching earths, as well as other adsorbents in general, are purposely made of a very fine powder in order to increase their specific surface. Consequently, when soaked with oil, SBE is generally a compact material. Therefore, the solvent percolation through such compact material is poor and reduces greatly the capacity of a percolation solvent extractor. Additionally, the very fine nature of the SBE allows it to sift through the supporting screen floor of a percolation solvent extractor, requiring a very fine mesh supporting screen floor which further reduces the percolation. Thus, for such compact material, sufficient solvent percolation is only attainable with a very thin bed of SBE laying on a fine mesh supporting screen floor of the solvent extractor, which consequently, reduces considerably its capacity. Therefore, this approach is cost prohibitive because it will require a significantly over-sized solvent extractor.

Extraction of the SBE in an immersion solvent extractor has also been attempted. The advantage of an immersion solvent extractor is that there is no supporting screen floor required and the extractor is not dependent upon percolation rates. It has been seen however that the slightest agitation of the SBE with hexane solvent will cause the very fine particles of SBE to go into suspension in the solvent. As a result, a significant portion of the SBE is suspended in the solvent and flow with said solvent, counter-current to the intended solids SBE progression and clog or severely foul the downstream distillation. As a result, the feasibility of using an immersion extractor is highly questionable and they have not been industrially applied.

The extraction of the residual oil contained in the SBE has also been attempted when said SBE is contained as a packed bed in vertical leaf-filter or even candle-filter equipped with fine mesh screens. The extraction is realized by introducing a flow of solvent such as hexane in those filters to wash away the residual oil contained in the SBE in a batch operation. However, such procedure is potentially hazardous and inefficient in many aspects. Indeed, the hermeticity of those filters is only satisfactory when those ones are fully loaded with SBE containing residual oil which is a compact and relatively sticky material. When a fraction of this residual oil is washed away and replaced by solvent, the SBE become loose and less sticky. Consequently, the uniformity in cake distribution and cake thickness in these filters is not properly maintained. Furthermore, hermiticity of these filters is not maintained as well, and as they operate under pressure, the risk of substantial leakage of solvent is real which is particularly hazardous. Furthermore, the partially washed SBE becoming less compact and less sticky may drop, hence they will not fill completely and homogeneously the filters. Consequently, washing solvent will preferably flow though voids progressively appearing in the SBE and hence an inefficient washing is observed. The desolventising of the de-oiled cakes inside filters by steam blowing is also questionable as the steam distribution through the cake will not be uniform and hence less efficient. For those reasons, extraction of the SBE' residual oil when this material is contained in filter such as leaf filter for example is particularly deficient.

Accordingly, it is has been proposed to realize the extraction of the residual oil contained in the SBE by mixing them with an extraction solvent to produce a slurry, and let the residual oil dissolve in the solvent, in particular non-polar solvent such as hexane. This approach is exemplified by U.S. Pat. No. 6,780,321 B2. This invention discloses a process to extract oil from SBE recovered from vegetable oil refining process. The process involves three sub-processes comprising of reacting the SBE with a solvent selected from a group consisting of toluene, acetone, xylene, isopropyl alcohol or n-hexane at a temperature between 35° C. to 50° C.; separating the solids and liquid from the slurry formed in the previous step; and extracting oil from the liquid fraction obtained in the previous step. The separation of the solids and the liquid from the slurry can be formed in two steps. The slurry mixture of solids and liquid is first separated into a solid fraction and a liquid fraction. The solid fraction so separated still contains a significant portion of oil. Therefore, the solid fraction is reacted with some solvent. The next slurry of solids and liquids is again separated into a solid fraction and a liquid fraction. Thus, in this process, two slurry extractions in series are necessary to sufficiently reduce the SBE residual oil content which in practice also require two phase separations, hence increasing the complexity and the cost of the process. Indeed, the filtration of the slurry is realized on a vacuum belt filter which means that the cake resulting from the filtration must be handled and mixed with solvent to produce the second slurry. This handling is complex because the cake contains flammable and explosive solvent such as hexane. Another disadvantage of U.S. Pat. No. 6,780,321 B2 process is the absolute necessity to prepare the slurries in a regulated area with explosion proof pieces of equipment and specific strict working procedures which incurs substantial additional installation and running cost. Even so, adding flammable and explosive solvent (such as hexane) to SBE, which is a self-igniting material, remains particularly hazardous. Furthermore, vacuum belt filters are very bulky and energy demanding pieces of equipment since the vacuum must be constantly maintained in a large volume. However, the risk generated by mixing the SBE, which is a self-igniting material, with flammable solvent such as hexane is most likely the major reason that such process, despite its merits, was not put into practice on an industrial scale. Separation of the SBE slurry with basket centrifuge has also been proposed to develop greater pressure differential to improve percolation rates. However, basket centrifuges also possess a screen covered with a cloth that are prone to fouling leading to low percolation of solvent, long filtration time and downtime for cleaning. Since flammable solvent is involved in the process, cleaning operations do not only imply major downtimes but also safety issues. The situation is particularly acute in the case of SBE because such material is inherently composed of a substantial fraction of fines particularly prone to foul screens and other filtration surfaces, especially when the SBE is slurried with glyceridic oil. As a matter of fact, separation of such oil-based slurry is not possible in a reasonable period of time with a basket centrifuge.

Thus, despite the merits of the prior art and prior practices, there is a need for a process allowing to recover the residual oil contained in SBE in a more safe and economical manner. In particular, there is a need for a process for which the slurry could be produced with non-flammable and non-explosive liquid thus decreasing considerably the risk of fire and/or explosion during said slurry preparation. Ideally the slurry should be prepared in non-regulated area and with non-explosion proof pieces of equipment. There is also a need for a process including a separation technology not relying on filtration screens in order to eliminate their fouling and the downtime and safety issues associated for the cleaning of fouled filtration surfaces.

SUMMARY

It is an object of the invention to disclose a process for the recovery of the oil contained in SBE.

It is also an object of this invention to disclose a process allowing the preparation of a slurry containing the SBE with non-explosive liquid and thus making possible the preparation of said slurry in non-regulated area, in particular the area where SBE is produced i.e. for example the area corresponding to the oil bleaching step in an oil refining facility, especially the direct vicinity of the leaf-filters from which SBE are discharged.

It is also an object of the invention to disclose a process not hampered by the fouling of filtration surface leading to cleaning downtimes and safety issues.

It is also an object of the invention to disclose a process reducing significantly fire and explosion hazards compared to existing processes.

It is an advantage of the invention to disclose a process for the recovery of the oil contained in SBE.

It is also an advantage of this invention to disclose a process allowing the preparation of slurry containing SBE with non-explosive liquid and thus making possible to prepare said slurry in non-regulated area, such as for example the oil refining area, in particular the area of the oil refinery where the oil is bleached. Consequently, said slurry can be prepared directly after the SBE discharge which suppresses the need to store and/or transport the flammable SBE from their production area to their extraction area reducing thus considerably the hazards, the investment and operative costs compared to current technologies.

It is also an advantage of the invention to disclose a process reducing significantly fire and explosion hazards compared to existing processes.

It is also an advantage of the invention to disclose a process not hampered by fouling of filtration surfaces.

Further aspects and advantages of the present invention will become apparent from the detailed description.

It is an advantage of the invention to disclose a process for the recovery of the oil contained in SBE.

It is also an advantage of this invention to disclose a process allowing the preparation of slurry containing SBE with non-explosive liquid and thus making possible to prepare said slurry in non-regulated area, such as for example the oil refining area, in particular the area of the oil refinery where the oil is bleached. Consequently, said slurry can be prepared directly after the SBE discharge which suppresses the need to store and/or transport the flammable SBE from their production area to their extraction area reducing thus considerably the hazards, the investment and operative costs compared to current technologies.

It is also an advantage of the invention to disclose a process reducing significantly fire and explosion hazards compared to existing processes.

It is also an advantage of the invention to disclose a process not hampered by fouling of filtration surfaces.

Further aspects and advantages of the present invention will become apparent from the detailed description.

It has been surprisingly observed that the above objects and advantages are realized with a process for the recovery of the residual oil contained in SBE comprising the steps of:
  a) producing a transportation slurry in a non-regulated area by mixing said SBE with oil,
  b) conducting said transportation slurry from said non-regulated area to a solvent extraction regulated area and mixing said transportation slurry with a non-polar solvent and/or a miscella containing a non-polar solvent to produce a first extraction slurry, said first extraction slurry being agitated to extract at least a fraction of the oil contained in said SBE, c) feeding the agitated first extraction slurry to at least one centrifuge decanter, said at least one centrifuge decanter separating said first agitated extraction slurry into at least a liquid full miscella and a sludge, said first sludge having at least 40% solid content, d) submitting the first sludge to a number of extraction cycle(s) to obtain de-oiled SBE containing less than 2% residual oil on a dry basis, each extraction cycle consisting of blending the sludge with non-polar solvent or miscella containing non-polar solvent to produce an extraction slurry, agitating said extraction slurry, and feeding said agitated extraction slurry to at least one centrifuge decanter, said at least one centrifuge decanter separating said agitated extraction slurry into a liquid miscella and a sludge having at least 40% solid content, e) evaporating the non-polar solvent of said full miscella of step c) to recover glyceridic oil and, after condensation, the liquid non-polar solvent, f) evaporating the solvent of said de-oiled SBE containing less than 2% residual oil of step d) to recover de-oiled and desolventized SBE and, after condensation, the liquid non-polar solvent.

It has been further surprisingly observed that the above objects and advantages are realized with the above described process wherein at least a part of the oil of the transportation slurry of step a) is removed before mixing said transportation slurry with a non-polar solvent and/or a miscella containing a non-polar solvent and wherein said at least partial removal of said oil is realised in said solvent extraction regulated area.

It has been further surprisingly observed that the above objects and advantages are realized with the above described process wherein at least a part of the oil of the transportation slurry of step a) is removed before mixing said transportation slurry with a non-polar solvent and/or a miscella containing a non-polar solvent and wherein said at least partial removal of said oil is realised in said solvent extraction regulated area, and wherein the oil removed from the transportation slurry is returned in the non-regulated area and is used, at least partially, to produce new transportation slurry by mixing said removed oil with SBE.

It has been further surprisingly observed that the above objects and advantages are realized with the above described process wherein the non-polar solvent is naphtha.

It has been further surprisingly observed that the above objects and advantages are realized with the above described process wherein the non-polar solvent is renewable fuel.

It has been further surprisingly observed that the above objects and advantages are realized with the above described process wherein the extraction cycles of step d) are realised counter-currently.

It has been further surprisingly observed that the above objects and advantages are realized with the above described process wherein the recovered oil obtained in step e) is conducted to an hydrotreatment unit reducing said oil to renewable fuel and naphtha.

It has been further surprisingly observed that the above objects and advantages are realized with the above described process wherein the recovered oil obtained in step e) undergone one or more refining step(s) before being conducted to an hydrotreatment unit reducing said refined oil to renewable fuel and naphtha.

It has been further surprisingly observed that the above objects and advantages are realized with the above described process wherein the recovered oil obtained in step e) is conducted to an hydrotreatment unit reducing said oil to renewable diesel and naphtha, said naphtha being used as non-polar solvent from step b) onwards.

It has been further surprisingly observed that the above objects and advantages are realized with the above described process wherein the recovered oil obtained in step e) undergone one or more refining step(s) before being conducted to an hydrotreatment unit reducing said refined oil to renewable diesel and naphtha, said naphtha being used as non-polar solvent from step b) onwards.

It has been further surprisingly observed that the above objects and advantages are realized with the above described process wherein evaporating the solvent of said de-oiled SBE containing less than 2% residual oil obtained in step d) is realized in a desolventizer using stripping steam contacted to said de-oiled SBE, said desolventizer being composed of a single tray, having a sufficient diameter to provide less than 0.5 m/s vapour velocity to said stripping steam to minimize the entrainment of the fines comprised into said de-oiled SBE by said stripping steam.

It has been further surprisingly observed that the above objects and advantages are realized with the above described process wherein evaporating the solvent of said de-oiled SBE containing less than 2% residual oil obtained in step d) is realized in a desolventizer using stripping steam contacted to said de-oiled SBE, said desolventizer being composed of a single tray, having a sufficient diameter to provide less than 0.5 m/s vapour velocity to said stripping steam to minimize the entrainment of the fines comprised into said de-oiled SBE by said stripping steam and wherein the stripping steam laden with the evaporated solvent exiting said desolventizer are passed through a water vapor scrubber removing a substantial amount of fine still present in said stripping steam laden with the evaporated solvent and therefore yielding clean stripping steam laden with the evaporated solvent.

It has been further surprisingly observed that the above objects and advantages are realized with the above described process wherein evaporating the solvent of said de-oiled SBE containing less than 2% residual oil obtained in step d) is realized in a desolventizer using stripping steam contacted to said de-oiled SBE, said desolventizer being composed of a single tray, having a sufficient diameter to provide less than 0.5 m/s vapour velocity to said stripping steam to minimize the entrainment of the fines comprised into said de-oiled SBE by said stripping steam and wherein the stripping steam laden with the evaporated solvent exiting said desolventizer are passed through a water vapor scrubber removing a substantial amount of fine still present in said stripping steam laden with the evaporated solvent and therefore yielding clean stripping steam laden with the evaporated solvent wherein said clean stripping steam laden with the evaporated solvent is used as heat source for the evaporation of the solvent from the full miscella obtained in step c).

The following description and the drawings disclose various illustrative aspects. Some improvements and novel aspects may be expressly identified, while others may be apparent from the description and drawings.

DESCRIPTION OF THE DRAWINGS

The accompanying drawings illustrate various systems, apparatuses, devices and methods, in which like reference characters refer to like parts throughout, and in which.

Figure 1:
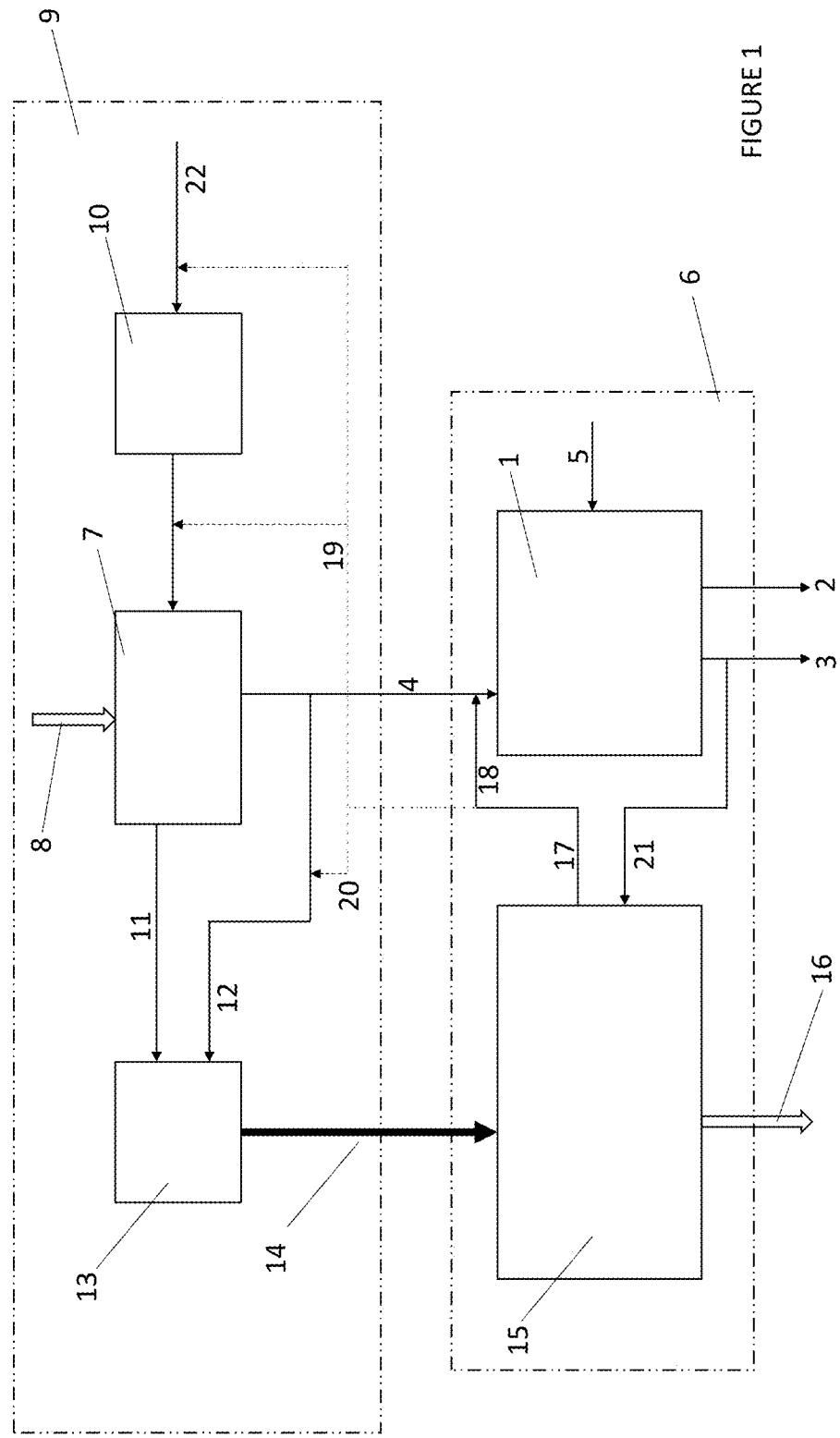
FIG. 1 depicts the preferred location of the transportation slurry preparation step and of the downstream steps involving flammable solvent in accordance with various disclosed aspects herein.

The invention may be embodied in several forms without departing from its spirit or essential characteristics. The scope of the invention is defined in the appended claims, rather than in the specific description preceding them. All embodiments that fall within the meaning and range of equivalency of the claims are therefore intended to be embraced by the claims.

DETAILED DESCRIPTION

Reference will now be made to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

DEFINITIONS

SBE. In the context of the present invention, the term "SBE" stands for "Spent Bleaching Earths" and refers to any solid material used for the refining of glyceridic oils. By extension, the term "SBE" also includes materials such as spent clays, spent filter aids, spent silicas, spent active carbons or any spent solid particulate material, or any blends thereof, used during the refining of glyceridic oil and containing absorbed residual oil after their usage during any step of the glyceridic oil refining. In our invention, the term "SBE", is also used when said SBE have been partially and/or totally extracted. SBE can be singular or plural depending on the context.

Slurry. In the context of the present invention, the term "slurry" refers to the suspension of a particulate solid material, in particular SBE, in a liquid medium. Adequate liquid mediums are for example non-polar solvent such as naphtha or renewable fuel but also their miscellas containing the same non-polar solvent (or blends thereof). It has been surprisingly found that liquid that are not solvents, in particular glyceridic oils are also adequate liquid to produce the slurry, in particular the transportation slurry. However non-polar solvents such as naphtha (or their corresponding miscellas) are necessary to produce an extraction slurry.

Miscella. In the context of the present invention, the term "miscella" refers to a solution and/or a suspension of glyceridic oil in a non-polar solvent such as naphtha or renewable diesel for example. Thus, a miscella contains highly flammable and explosive non-polar solvent and glyceridic oil. In the process according to the present invention, miscellas of various strengths (of various concentrations in glyceridic oil) are found. The miscella having the highest strength is called the "full miscella" and all the other miscellas are collectively called "miscellas of intermediate strength", or "medium miscella" or "weak/weaker miscellas". The full miscella is sent to a distillation unit to evaporate the non-polar solvent, which is recycled in the process and recovering thus the oil that has been extracted from the SBE. Optionally, if the extraction solvent is renewable diesel the miscella can be sent directly to a hydrotreatment unit for example.

Glyceridic oil. In the context of the present invention, the terms "glyceridic oil" refer to oils and fats or blends thereof containing tri- and partial glycerides and optionally FFA and/or the typical various impurities contained in natural or recycled oils and fats. Glyceridic oil may be of animal or vegetal origin, may be edible or non-edible, may be crude, partially refined or fully refined, may be modified by processes such as interesterification, fractionation, hydrogenation, or may be obtained from the collection of waste oils and fats of various origins.

Non-polar solvents. In the context of the present invention, the terms "non-polar solvents" refer to solvents able to solubilise and extract the residual oil contained in SBE such as for example naphtha or renewable fuel. Preferred solvent is naphtha since this one is produced in large quantity by hydrotreatment unit, is economical and has a low boiling point (about 60° C.). Non-polar solvents are usually highly flammable and explosive liquid. Optionally halogenated solvents may be useful for the present invention. However, halogenated solvents are usually avoided or even forbidden in some jurisdictions due to their toxicity and their adverse effects on the environment. Halogenated solvents are also usually considerably more expensive than naphta or renewable fuel. It must be noted that in the present invention, miscellas, and in particular miscellas of intermediate strengths can be used as solvent to prepare extraction slurries and therefore to solubilise and extract at least a fraction of the residual oil present in the SBE.

Non-explosive liquid. In the context of the present invention, the terms "non-explosive liquid" designate a liquid that is not more flammable and not more explosive that the typical glyceridic oil (such as soybean oil, palm oil, animal fat for example) when such glyceridic oil undergone a bleaching refining step. Thus, the safety measures in place to handle such typical glyceridic oil will also be satisfactory if similar glyceridic oils are used to produce a slurry of SBE (the transportation slurry according to the present invention), particularly if the temperature of said glyceridic oil ranges from 60° C. to 130° C. which is the maximal bleaching temperature range, 90° C. to 100° C. being the most usual and preferred bleaching temperature range.

Renewable fuel. In the context of the present invention, the terms "renewable fuel" refer to a fuel produced by the hydrotreatment of glyceridic oil, i.e. the reduction of glyceridic oil in presence of hydrogen and catalyst. Renewable fuel, which is very similar to standard diesel or jet fuel, is a mixture of linear alkanes. Renewable fuel is technically advantageous over FAME biodiesel. Its production process is described in JP2009138144 and a full review of their properties is available in: "*Hydrotreated vegetable oil (HVO)—premium renewable biofuel for diesel engines, Neste oil Proprietary publication for public use, February 2014*".

Naphtha: In the context of the present invention, the term "naphtha" is a distillation cut of the product resulting from the hydrotreatment of glyceridic oil. It corresponds to the reduction, condensation and isomerisation of the glycerine part of the glyceridic oil and is a mixture of different saturated hydrocarbon compounds. Its catalytic reforming leads to high quality and high octane gasoline. It has been surprisingly found that naphtha can advantageously be used as extraction solvent. Solubility of oil in naphtha is excellent and its boiling point is low (about 60° C.). Its cost is lower than other traditional solvent such as hexane that is often used in extraction processes. Furthermore, naphtha is abundantly available when the present process is implemented in the proximity of a hydrotreatment complex.

Regulated area: In the context of the present invention, the terms "regulated area" or its abbreviation "RA" indicate that highly flammable and/or explosive substances are used. Typically, costly explosion proof equipment and very strict and constringent working procedures must be used in such regulated area implying both higher investment and operating costs.

Non-regulated area: In the context of the present invention, the terms "non-regulated area", or its abbreviation "NRA" indicate that no flammable and no explosive substances are used. Typically, standard equipment and working procedures can be used in such area. Glyceridic oil bleaching operations are usually realised in a non-regulated area since bleaching, which is a standard refining step, does not involve flammable or explosive substances.

Centrifuge decanters: In the context of the present invention, the terms "centrifuge decanters" refer to industrial centrifuges that continuously separates solids from liquids. The separation in a centrifuge decanter occurs due to the high centrifugal force generated by its rotating bowl. Centrifuge decanter are not equipped with filtration surface. In the context of the present invention, centrifuge decanters encompass dual-phase centrifuge scroll separation able to separates slurries containing suspended solids in a mix of non-polar solvent and oil into a liquid phase and a sludge with high solid content.

DISCUSSION OF FIGURES

The present invention will be disclosed in detail with the help of the figures. As seen in FIG. 1, the process according to the present invention is particularly advantageous when implemented to a hydrotreatment unit (1) producing renewable fuel (2) and naphtha (3) from purified glyceridic oil (4) and hydrogen (5). Such hydrotreatment unit is located in regulated area (6) (RA). Typically, the last step yielding to the purified glyceridic oil is a bleaching step (7) making use of bleaching earths (8). Such bleaching step is realised in a non-regulated area (9) (NRA) where typically all the other upstream purification steps (10) will also occur such as for example degumming and/or water washing to obtain purified glyceridic oil from low quality animal fat and/or recycled vegetable oil (22). Therefore, the bleaching operation produces purified glyceridic oil that is conducted (4) to the HVO unit (1) and spent bleaching earth (SBE) (11) that can be continuously mixed (13) to glyceridic oil (12) such as for example purified glyceridic oil to produce a transportation slurry (14) that is easily and safely conducted from the NRA (9) to the RA (6) where the steps (15) of the present process involving flammable solvent are realised. Therefore, de-oiled SBE are obtained (16) as well as glyceridic oil. This one can be directly used as feed-stock (18) for the hydrotreatment unit or blended to the low-quality oil at any stage (19) of its purification process. Alternatively, the recovered oil can be used, at least partially, to produce the transportation slurry (20). A small fraction of the naphtha produced by the hydrotreatment unit (1) can be used as solvent (21) in the steps of the present process involving flammable solvent (15). In FIG. 1, the NRA (9) and the RA (6) are adjacent but in reality, they will be separated by typically 50 meters or more. Therefore, an easy and safe transportation method of the SBE from the NRA (9) to the RA (6) is essential and provided by the present invention in the form a transportation slurry made of SBE (11) and glyceridic oil (12).

The present invention will be disclosed in detail with the help of the figures. However, the present invention is limited by the claims and not by those figures.

Figure 2:
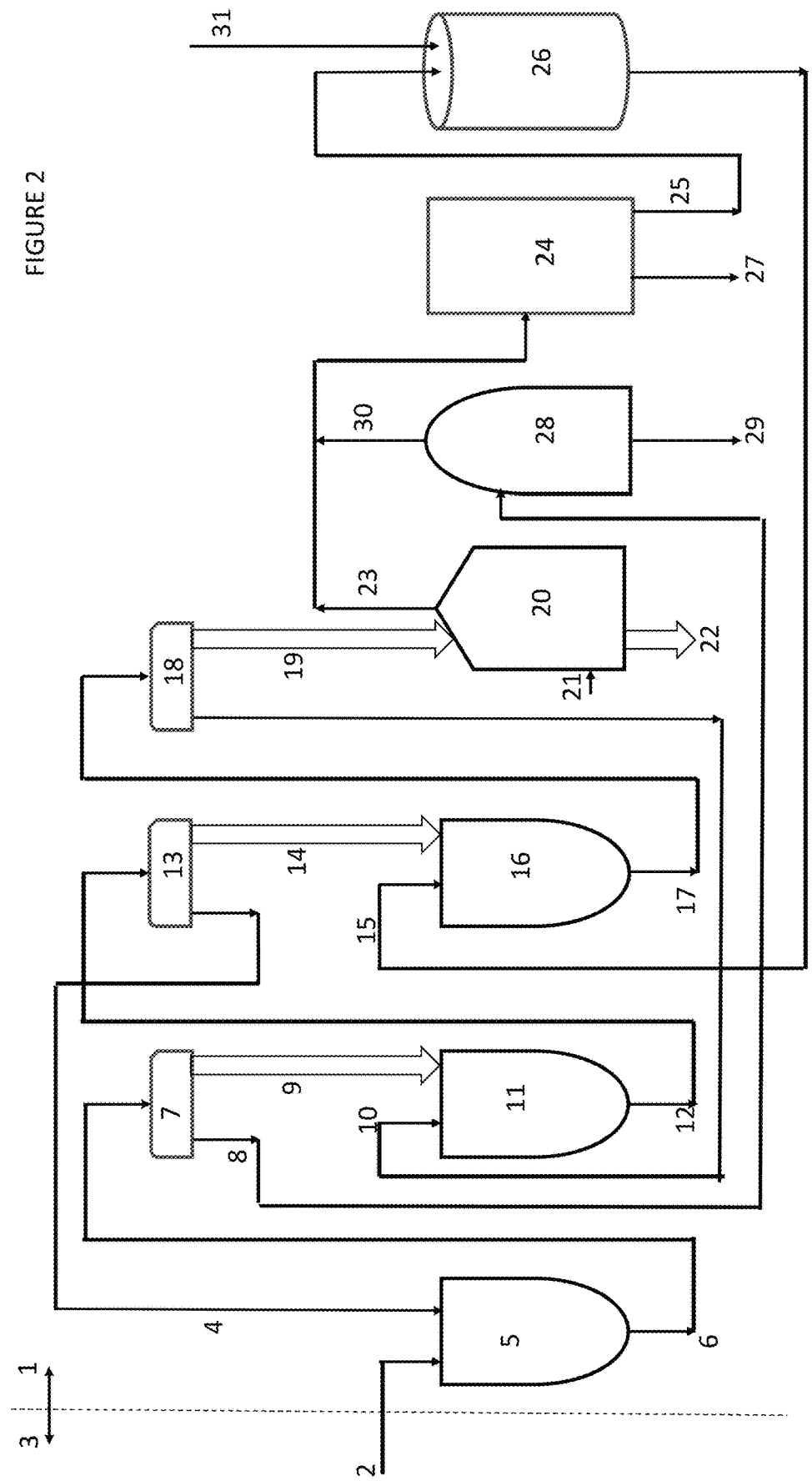
FIG. 2 depicts the steps involving flammable solvent in accordance with various disclosed aspects herein.

As seen in FIG. 1, the process according to the present invention is particularly advantageous when implemented to a hydrotreatment unit (1) producing renewable fuel (2) and naphtha (3) from purified glyceridic oil (4) and hydrogen (5). Such hydrotreatment unit is located in regulated area (6) (RA). Typically, the last step yielding to the purified glyceridic oil is a bleaching step (7) making use of bleaching earths (8). Such bleaching step is realised in a non-regulated area (9) (NRA) where typically all the other upstream purification steps (10) will also occur such as for example degumming and/or water washing to obtain purified glyceridic oil from low quality animal fat and/or recycled vegetable oil (22). Therefore, the bleaching operation produces purified glyceridic oil that is conducted (4) to the HVO unit (1) and spent bleaching earth (SBE) (11) that can be continuously mixed (13) to glyceridic oil (12) such as for example purified glyceridic oil to produce a transportation slurry (14) that is easily and safely conducted from the NRA (9) to the RA (6) where the steps (15) of the present process involving flammable solvent are realised. Therefore, de-oiled SBE are obtained (16) as well as glyceridic oil. This one can be directly used as feed-stock (18) for the hydrotreatment unit or blended to the low-quality oil at any stage (19) of its purification process. Alternatively, the recovered oil can be used, at least partially, to produce the transportation slurry (20). A small fraction of the naphtha produced by the hydrotreatment unit (1) can be used as solvent (21) in the steps of the present process involving flammable solvent (15). In FIG. 1, the NRA (9) and the RA (6) are adjacent but in reality, they will be separated by typically 50 meters or more. Therefore, an easy and safe transportation method of the SBE from the NRA (9) to the RA (6) is essential and provided by the present invention in the form a transportation slurry made of SBE (11) and glyceridic oil (12). FIG. 2 is a description of the steps of the present process involving flammable solvent such as typically naphtha. Therefore, those steps are located in a RA (1) whereas the transportation slurry (2) preparation step is advantageously located in an NRA (3). Accordingly, the transportation slurry (2) is mixed with the medium miscella (4) in first extraction vessel (5) to form the first extraction slurry. The mixing take place typically during 2 to 15 minutes. As a matter of fact, since the present process is preferably continuous, the first extraction vessel, (as well as the downstream extraction vessels) are sized to allow for the targeted residence time. Consequently, the first extraction slurry (6) is conducted to the first centrifuge decanter (7) which separate it into the full miscella (8) and the first sludge (9). The first sludge still contains oil that need to be extracted and therefore this one is mixed with the weak miscella (10) in the second extraction vessel (11) to form the second extraction slurry. After sufficient residence time in the second extraction vessel (typically during 2 to 15 minutes), this second extraction slurry (12) is conducted to the second centrifuge decanter (13) which separates it into the medium miscella (4) and the second sludge (14). The medium miscella is thus used to produce the first extraction slurry. The second sludge typically still contains more that 2% of residual oil and is mixed with pure solvent (15), preferably naphtha in the third extraction vessel (16) to form the third extraction slurry. After sufficient residence time (again typically from 2 to 15 minutes), the third extraction slurry (17) is conducted to the third centrifuge decanter (18) which separates it into the weak miscella (10) and the third sludge (19). Typically, the third sludge contains SBE that has been sufficiently de-oiled and therefore this one is conducted to the desolventizer (20) where solvent contained in said third sludge is evaporated by contacting it with stripping steam (21). Consequently, desolventized and de-oiled SBE (22) exits the desolventizer as well as solvent laden vapours (23). Those solvent laden vapours are conducted to a solvent recovery unit (24) where typically at least condensation and decantation operation are conducted and yield to pure solvent (25) conducted to the solvent tank (26) and water (27). The full miscella (8) is conducted to a distillation unit (28) yielding to the oil (29) that has been extracted from the SBE and solvent vapour (30) that are conducted to the solvent recovery unit (24). Therefore, the solvent is constantly recovered and recycled. The small losses of solvent are topped-up (31) for example by the naphtha produced by a hydrotreatment unit (shown in FIG. 1).

Accordingly, it has been surprisingly observed that the fire and explosion hazards associated with the preparation of a slurry with SBE, which is a self-igniting material, are fully suppressed when said slurry is prepared with sufficient glyceridic oil thus minimizing the ability of oxygen to reach the surface of the SBE. Accordingly, the slurry containing SBE and glyceridic oil can therefore be prepared safely in non-regulated area, for example in the close vicinity of the bleaching step which produce the SBE. Furthermore, said slurry containing SBE and glyceridic oil is stable (not self-igniting), nonhazardous to transport, store and mix with solvent. Therefore, said slurry containing SBE dispersed in glyceridic oil is called the "transportation slurry". As a matter of fact, this transportation slurry allows for the safe transportation of SBE from its production location in a non-regulated area to its extraction location in a regulated area via adequate piping, pump and optional buffer or day tank.

Consequently, the preparation of an "extraction slurry" can be safely realized as well in a regulated area by mixing the transportation slurry with solvent and/or miscella, preferably naphtha and/or miscella based on naphtha. Indeed, the transportation slurry is not self-igniting. The present invention simplifies and secures greatly the safe preparation of such extraction slurry which requires non-polar solvents, such as naphtha inherently highly flammable by eliminating the potential source of ignition. Mixing is for example realized in a first extraction tank by blending the transportation slurry with solvent and/or with the strongest miscella of the intermediate miscellas. This first extraction slurry is mixed during a sufficient time to solubilize and extract a substantial fraction of the oil absorbed on the SBE. It is observed that about 2 minutes to about 15 minutes of mixing will allow to reach an equilibrium. Since the transportation slurry is stabilized (i.e., not self-igniting), its mixing with solvent is considerably safer compared to prior art' suggested practices consisting in preparing the extraction slurry directly by mixing a flammable solvent to the SBE which is a potential source of ignition.

Optionally, at least a part of the oil that was added to the SBE to prepare the transportation slurry can be removed before mixing said transportation slurry with a non-polar solvent and/or a miscella containing a non-polar solvent. Preferably such partial removal of the said oil that was added to the SBE is realized in the regulated area and can use any phase separation devices known in the art. However, phase separation devices having no filtration surfaces are preferred such as centrifuges or decanters. It has been observed that in practice only a part of the added oil is removed and the resulting partially de-oiled transportation slurry is still non-igniting and can be safely mixed with polar solvent or miscella containing polar solvent. Therefore, this optional oil removal is preferably realized in the immediate vicinity of the first extraction tank, the phase separation device used for said optional oil removal being positioned to permit the resulting partially de-oiled transportation slurry to drop by gravity into said first extraction tank. Even if this step increases the complexity of the process, it may be preferred since it permits to reduce the quantity of the oil that must be solvent-extracted and hence also reduce the quantity of the needed solvent to realize such extraction. This optionally recovered oil is advantageously returned in the non-regulated area and can be used to produce new transportation slurry. Consequently, the presence of residual SBE particles in this optionally recovered oil is not problematic and hence put less constrain on the selectivity of this optional preliminary phase separation step.

This initial extraction slurry is then conducted to a centrifuge decanter and separated in a liquid full miscella and a sludge which typically has a solid content higher that 50%. The full miscella is then conducted to a distillation unit to recover the solvent and the extracted oil. Optionally the full miscella may be clarified in a cyclone to remove eventual fines corresponding to the smallest SBE particles that may have been entrained in the full miscella. The sludge is typically a very thick slurry that contains the SBE and still a significant fraction of oil and solvent. Therefore, this sludge is mixed again with a solvent and/or a weak miscella to produce a second extraction slurry. Again, this second extraction slurry is mixed during a sufficient time to solubilize and extract a substantial fraction of the oil still absorbed on the SBE and conducted to a second centrifuge decanter which separate said second extraction slurry in a liquid intermediate miscella and an intermediate sludge. The intermediate miscella is advantageously used as solvent to prepare the initial extraction slurry. The intermediate sludge often contains more than 2% of residual oil (on a dry basis) and therefore a third extraction stage is necessary. Accordingly, the intermediate sludge is mixed preferably with pure solvent to realize the third extraction slurry which is mixed again during a sufficient time to solubilize and extract the remaining residual oil contained in the SBE. This third extraction slurry is conducted to a third centrifuge decanter and separated into a liquid weak miscella and a third sludge. The weak miscella is advantageously used to prepare the second extraction slurry and the third sludge is usually sufficiently low in residual oil to be considered, after solvent evaporation, safe for transportation, storage and disposal. Therefore, the third sludge is conducted to a desolventizer to evaporate and recover the solvent and the de-oiled and desolventised SBE. In the unlikely hypothesis that three extraction steps would not be sufficient to produce de-oiled SBE, a fourth extraction slurry will be prepared and conducted to a fourth centrifuge decanter. Alternatively, the volume of pure solvent used to produce the third slurry may be increased to solubilize and extract more residual oil from the SBE.

The various streams (sludges and miscellas) produced by the centrifuge decanters are continuously discharged and easy to handle. Miscellas are liquid and can be pumped, transported and stored by regular means known in the art. The sludges can be transported by preferably inclined chutes or vapor-tight conveyors. The continuous aspect of the present invention is highly advantageous. This is in sharp contrast with other separation technologies such as the ones relaying on basket centrifuges or filters discharging a large batch of cake at a given moment. Such large quantity is hazardous since it contains flammable solvent, may be difficult to handle and may require the attention and the intervention of operators. Furthermore, mixing such large quantity of cake with solvent or miscella in the case of a multistage process may turn to be complex.

Consequently, the process according to the present invention is highly advantageous since it is continuous, can be automated, requires limited handling and reduce considerably safety issues, in particular the fire and explosion hazards during the preparation of the various slurries, in particular the transportation slurry.

The present invention is particularly advantageous for the oil extraction from SBE resulting from the pre-treatment of glyceridic oil of low quality that are converted in renewable fuel in a process known as hydrotreatment process. Hydrotreatment process tolerates highly degraded oil containing a large proportion of FFA (such as low-quality animal fat, recycled vegetable oil etc.), but requires glyceridic oil with low concentration of P and metals such as Na, K, Mg, Ca, Fe that are removed by several refining operations including one or more intense bleaching step(s). Consequently, such refining operations produce usually a fairly large quantity of SBE. Such hydrotreatment process also produces a lighter hydrocarbon fraction called naphtha which results from the reduction, deoxygenation, condensation and isomerization of the glycerin moieties of the glyceridic oil. Surprisingly, naphtha is an excellent extraction solvent for the SBE residual oil. Therefore, the transportation slurry is advantageously produced in the glyceridic oil refining area which is usually a non-regulated area and transported to a regulated area where the hydrotreatment unit and the SBE extraction unit are installed. Local legislation often imposes that a regulated area must be installed at distance of non-regulated area and therefore, the transportation of the SBE via a liquid and pumpable transportation slurry, as disclosed by the present invention, is highly advantageous over transportation of solid SBE via conveyors. Utilization of naphtha to produce the extraction slurries is also advantageous compared to known and standard solvent suggested by prior art documents since naphtha is abundantly available on site and economical. Even if the solvent used in the extraction is fully recycled, some losses are unavoidable. Indeed, about 1,000 ppm of solvent remain in the SBE and about 30 ppm in the recovered oil and a small quantity of solvent may leak out during some steps, especially during the transportation of the sludges. Therefore, the availability of an economical source of replenishment solvent is a real advantage.

Thus, producing a transportation slurry with glyceridic oil is highly advantageous from a safety point of view. Indeed, in that case, the slurry preparation can be located in a non-regulated area such as for example the direct vicinity of the oil refining installations, in particular the bleaching step where the SBE is produced. Consequently, the SBE must not be transported and stored, prior to their subsequent treatment, but can be directly transformed in a non-explosive slurry that can be easily pumped, typically in an agitated day tank to be treated by the next steps of the process according to the present invention, said next steps making use of flammable non-polar solvent. Thus, producing a transportation slurry of SBE with glyceridic oil which is a non-flammable and non-explosive liquid in the condition of temperature selected, save considerable expenditure and is considerably safer than methods suggested by prior art.

The de-oiled SBE typically contains about 2% or less of residual oil and such low amount has been proven to present no self-ignition issue. Thus, the de-oiled and thermally desolventized SBE can be safely stored, transported, disposed of in landfill or recycled in application such as garden amendment for moisture retention.

Even if it may seem counter-productive to realize said slurry with glyceridic oil, since the goal of the process is to extract glyceridic oil from the SBE, this mode of preparation of the slurry, according to the present invention, is advantageous in many aspects. If the slurry is prepared with non-polar solvent such as hexane or renewable fuel, the slurry tank and all other equipment must be explosion proof and placed in a regulated area. And mixing potentially self-igniting SBE with flammable solvent remains highly hazardous even if realized in a regulated area. Nitrogen blanketing of the slurry tank can further reduce any hazard when preparing the slurry with glyceridic oil. Said slurry is sufficiently fluid to be pumped over a long distance to a regulated area where flammable solvents are used. Regulation often imposes minimal distance of 50 meters or more between such regulated area and non-regulated area. The present invention permits easy and safe transportation of the SBE over such long distance and an efficient and safe connection between non-regulated and regulated areas, its storage in a buffer or a day tank and its subsequent mixing with flammable solvent in order to produce an extraction slurry.

It has been also surprisingly observed that the renewable fuel (or miscellas containing the same) can be used as non-polar liquid to prepare the extraction slurries. Consequently, the full miscella can be directly conducted and processed by the hydrotreatment unit since the presence of renewable fuel has no deleterious effect on the hydrotreatment process. Indeed, renewable fuel is fully saturated and will not compete in the hydrogenation reaction. After the extraction, the de-oiled SBE contains thus renewable fuel which must be thermally removed. This step is energy intensive since the boiling point of renewable diesel is considerably higher than naphtha. Therefore, despite its advantageous aspect, this embodiment is only realisable when a substantial stream of waste thermal energy is available on the site. However, such waste thermal energy stream is relatively frequent in petrol refineries complex. Of course, when the full miscella is not processed by a hydrotreatment unit and must be thermally removed from said full miscella, it is much more economical to realise the extraction with a more volatile solvent such as naphtha.

Main Process Parameters
Slurry Preparation.

Transportation slurry. In the process according to the present invention, the primary function of producing the transportation slurry is to transform the problematic self-igniting solid SBE into a liquid of adequate viscosity able to be safely pumped, and safely transported (preferably by pipe), safely stored (at least temporally) and safely mixed with flammable solvents. Typically, this requires adding to the SBE about 30% to 130% of glyceridic oil (on a weight/weight basis). Typical temperature range for preparing the transportation slurry is about 90° C. to 70° C. 90° C. is the temperature of the SBE when discharged from the leaf-filter(s) of the bleaching operation which indeed ends with the filtration of the bleached oil in a leaf-filter. But the discharged SBE can be allowed to cool to about 70° C. before being mixed with glyceridic oil. Typically, the temperature of the glyceridic oil that is mixed to the discharged SBE to produce the transportation slurry will be about 50° C. giving a transportation slurry having usually a temperature of about 60 to 70° C. Alternatively, the filtration realized after the oil bleaching can be tuned to let enough oil in order to directly obtain the transportation slurry discharged from the leaf-filter. In all case the temperature of the transportation slurry must be reduced to a temperature about equal to the low boiling range temperature of the extraction solvent before being mixing with said extraction solvent. If naphtha is used as extraction solvent, the preferred temperature of the transportation slurry prior its mixing with said naphtha is about 55° C. As a matter of fact, the temperature of transportation slurry will decrease during its conveying. Practically, it is stored in a buffer or day tank maintained at the desired temperature and gently agitated to avoid sedimentation of the larger SBE particles.

Producing a transportation slurry with glyceridic oil yield to a stable and non-hazardous slurry. Typical the glyceridic oil used is the same oil than the one refined in the facility. It must be noted that glyceridic oil cannot be considered as a non-polar solvent since its boiling point is excessively high (above 300° C.) and even if contacting SBE with glyceridic oil will conceivably displace some of the oil absorbed in said SBE, it will not result in a net extraction of the oil contained in the SBE since the displaced absorbed oil will be replaced by the glyceridic oil that was used to produce the slurry.

Extraction slurries. Extraction slurry are realised by mixing the transportation slurry or the sludges produced by the centrifuge decanters with about an equivalent quantity of solvent and/or miscella containing the same solvent. Mixing temperature is preferably about equal to the low boiling range temperature of solvent. Typical temperature is 55° C. when naphtha or miscellas containing naphtha are used. Extraction slurries are agitated typically at 55° C. in extraction tanks to facilitate the solubilisation and extraction of residual oil contained in the SBE and to avoid sedimentation. Typical mixing time ranges between 2 and 15 minutes realised with rotating mechanical agitators. A gentle agitation of about 10 to 50 rpm is usually sufficient. Unlike SBE discharged from leaf-filter, sludges are not prone to self-ignition. This is due to the fact that in a sludge, the SBE particles are still blanketed by a significant volume of liquid, typically 40 to 50% (w/w) and therefore the SBE particles are not exposed to oxygen. However, it is a good practice to mix the sludge with solvent and/or miscella directly after their discharge from the centrifuge decanters and therefore obtain a new extraction slurry. Since an extraction slurry contain typically about 75 to 80% of liquid, the SBE particles are fully immersed and protected from oxygen. Thus, extraction slurries are stable material not prone to self-ignition.

Counter-current mode of continuous extraction. In the present invention, the extraction of SBE is preferably realised in a counter-current mode and continuously. Therefore, miscellas of various strength are collected into dedicated miscella tanks and recycled as solvent to prepare extraction slurries in a counter-current mode. The sludges are successively mixed with various miscellas of decreasing strengths and finally with pure solvent. However, the full miscella, i.e. the miscella containing the highest concentration of recovered glyceridic oil is not recycled as solvent but sent to a distillation installation to recover the solvent and the extracted oil. This counter-current mode permits to obtain a concentrated full miscella and thus reduce the specific energy demand during the thermal evaporation step. Typically, the full miscella will contain about 20% to 40% of oil (w/w).

Centrifuge decanter. Good results have been obtained with centrifuge decanter supplied by Seibentechnik. However, it is expected that centrifuge decanters supplied by other manufacturers will be satisfactory as well. Centrifuge decanters able to handle abrasive substances and flammable solvent must be selected. Indeed, SBE are relatively abrasive. It must be noted that centrifuge separators are compact and in particular much more compact than vacuum belt filters or leaf filters the use thereof is suggested in prior art. Therefore, the process according to the present invention is advantageous since it requires a limited footprint compared to current technologies. Centrifuge decanter can be operated continuously and are not equipped with filtration surface such as screen and/or cloth filtration material. The phase separation is solely based on centrifugal forces and therefore the present process is not affected by fouling phenomenon inducing downtimes for cleaning and associate safety concerns.

Miscellas handling. Miscellas are always resulting from a phase separation occurring in at least one centrifuge decanter. Miscellas of various concentrations in oil are found in the process according to the present invention and must be collected in dedicated miscella collecting tanks. Full-miscella is the most concentrated miscella and contains usually about 20 to 40% of recovered oil. Its distillation can be realized in equipment similar to the one used in the field of the solvent extraction of edible oil. However, dedicated distillation equipment is preferred to avoid any mixing of the recovered oil from SBE with edible oil. The recovered oil can be used directly as feedstock for the production of biodiesel or renewable diesel, or other oleochemical applications such as the production of FFA, or blended in the glyceridic materiel that is refined.

Final sludge handling. The final sludge containing the de-oiled SBE is usually directly conveyed to a desolventizer for the evaporative removal of the remaining solvent which is then condensed, optionally decanted to remove water, and recycled in the extraction process. It is a good practice to limit the exposure of the final sludge to oxygen until the sludge is solvent-free. The evaporative removal of the remaining solvent is realised by contacting steam to the final sludge. It has been found that a vertical desolventizer made of one steam-sparging compartment, similar to the ones used for the desolventization of the extracted meal obtained in the solvent oil extraction of oleaginous material, is very efficient. It was surprisingly found that when the sludge becomes solvent free, its fine texture causes it to be easily entrained with the outgoing solvent/water vapors. To minimize such entrainment, the diameter of the desolventizer is made sufficiently large to slow the rising vapor velocity. Any residual fines remaining in the vapor stream are then removed from the vapor stream by a water scrubber prior to using the waste heat from the desolventizer as the primary heating source for evaporation of the solvent from the recovered SBE oil. Preferably such desolventizer is equipped of hardened internal surfaces to resist to the abrasive properties of the SBE. The volume inside such desolventizers is saturated with steam and solvent vapours and therefore oxygen is nearly entirely excluded. Typically, a de-oiled SBE containing less than 2% of residual oil and less than 1,000 ppm of solvent will exit such desolventizer. It is thus safely storable, transportable and safe enough to be disposed of in landfills. The de-oiled SBE can be used for soil amendment, for example as a moisture retainer.

Thus, the present invention is able to transform a problematic waste into valuable products. It must be pointed out that the process according to the present invention is highly advantageous over current practices. Indeed, said process is continuous and is not interrupted by downtimes to clean fouled filtration surface and reduce considerably safety issues. Furthermore, the process has a limited foot-print and can be fully automatized.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components or methodologies described above may be combined or added together in any permutation. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A continuous process for the recovery of residual oil contained in spent bleaching earths (SBE) comprising the steps of:
    a) producing a transportation slurry in a non-regulated area by mixing said SBE with oil,
    b) conducting said transportation slurry from said non-regulated area to a solvent extraction regulated area and mixing said transportation slurry with a non-polar solvent and/or a miscella containing a non-polar solvent in a first extraction vessel to produce a first extraction slurry, said first extraction slurry being agitated to extract at least a fraction of the oil contained in said SBE,
    c) feeding the agitated first extraction slurry to a first centrifuge decanter, said first centrifuge decanter separating said agitated first extraction slurry into at least a liquid full miscella and a first sludge, said first sludge having at least 40% solid content,
    d) submitting the first sludge to a number of extraction cycle(s) to obtain de-oiled SBE containing less than 2% residual oil on a dry basis, each extraction cycle consisting of blending a sludge with a non-polar solvent or miscella containing a non-polar solvent in a further extraction vessel to produce a further extraction slurry, agitating said further extraction slurry, and feeding said agitated further extraction slurry to a further centrifuge decanter, said further centrifuge decanter separating said agitated further extraction slurry into a liquid miscella and a further sludge having at least 40% solid content, wherein the last extraction cycle produces a final sludge comprising the de-oiled SBE containing less than 2% residual oil on a dry basis,
    e) evaporating the non-polar solvent of said liquid full miscella of step c) to recover glyceridic oil and, after condensation, a liquid non-polar solvent, and
    f) evaporating a remaining portion of the non-polar solvent of said de-oiled SBE containing less than 2% residual oil of step d) to recover de-oiled and desolventized SBE and, after condensation, a further liquid non-polar solvent.

2. The process according to claim 1 wherein at least a part of the oil of the transportation slurry of step a) is removed before mixing said transportation slurry with a non-polar solvent and/or a miscella containing a non-polar solvent and wherein said at least partial removal of said oil is realized in said solvent extraction regulated area.

3. The process according to claim 1 wherein at least a part of the oil of the transportation slum, of step a) is removed before mixing said transportation slurry with a non-polar solvent and/or a miscella containing a non-polar solvent, and wherein said at least partial removal of said oil is realized in said solvent extraction regulated area, and wherein the oil removed from the transportation slurry is returned in the non-regulated area and is used, at least partially, to produce new transportation slurry by mixing said removed oil with SBE.

4. The process according to claim 1 characterized in that the non-polar solvent is naphtha.

5. The process according to claim 1 characterized in that the non-polar solvent is renewable fuel.

6. The process according to claim 1 wherein, the extraction cycles of step d) are realized counter-currently.

7. The process according to claim 1 wherein the recovered oil obtained in step e) is conducted to a hydrotreatment unit reducing said oil to renewable fuel and naphtha.

8. The process according to claim 1 wherein the recovered oil obtained in step e) undergoes one or more refining step(s) before being conducted to an hydrotreatment unit reducing said refined oil to renewable fuel and naphtha.

9. The process according to claim 1 wherein the recovered oil obtained in step e) is conducted to a hydrotreatment unit reducing said oil to renewable diesel and naphtha, said naphtha being used as non-polar solvent from step b) onwards.

10. The process according to claim 1 wherein the recovered oil obtained in step e) undergoes one or more refining step(s) before being conducted to a hydrotreatment unit reducing said refined oil to renewable diesel and naphtha, said naphtha being used as non-polar solvent from step b) onwards.

11. The process according to claim 1 wherein evaporating the solvent of said de-oiled SBE containing less than 2% residual oil obtained in step d) is realized in a desolventizer using stripping steam contacted to said de-oiled SBE, said desolventizer being composed of a single tray, having a sufficient diameter to provide less than 0.5 m/s vapor velocity to said stripping steam to minimize the entrainment of fines comprised into said de-oiled SBE by said stripping steam.

12. The process according to claim 1 wherein evaporating the solvent of said de-oiled SBE containing less than 2% residual oil obtained in step d) is realized in a desolventizer using stripping steam contacted to said de-oiled SBE, said desolventizer being composed of a single tray, having a sufficient diameter to provide less than 0.5 m/s vapor velocity to said stripping steam to minimize the entrainment of fines comprised into said de-oiled SBE by said stripping steam, and wherein the stripping steam laden with the evaporated solvent exiting said desolventizer is passed through a water vapor scrubber removing an amount of fines still present in said stripping steam laden with the evaporated solvent and therefore yielding clean stripping steam laden with the evaporated solvent.

13. The process according to claim 1 wherein evaporating the solvent of said de-oiled SBE containing less than 2% residual oil obtained in step d) is realized in a desolventizer using stripping steam contacted to said de-oiled SBE, said desolventizer being composed of a single tray, having a sufficient diameter to provide less than 0.5 m/s vapor velocity to said stripping steam to minimize the entrainment of fines comprised into said de-oiled SBE by said stripping steam, and wherein the stripping steam laden with the evaporated solvent exiting said desolventizer is passed through a water vapor scrubber removing an amount of fines still present in said stripping steam laden with the evaporated solvent and therefore yielding clean stripping steam laden with the evaporated solvent wherein said clean stripping steam laden with the evaporated solvent is used as heat source for the evaporation of the solvent from the full miscella obtained in step c).

* * * * *